United States Patent [19]

DeCarlo et al.

[11] 4,255,979
[45] Mar. 17, 1981

[54] PULSE WIDTH MODULATED BINARY REBALANCE RATE CAPTURE LOOP CONTROL FOR TWO-DEGREE-OF-FREEDOM DRY TUNED GYRO

[75] Inventors: Frank S. DeCarlo, Wyckoff; Frank L. Rosen, Parsippany; Walter J. Goetz, Wayne, all of N.J.

[73] Assignee: The Singer Company, Little Falls, N.J.

[21] Appl. No.: 869,898

[22] Filed: Jan. 16, 1978

[51] Int. Cl.³ .................... G01C 19/28; G01C 19/30
[52] U.S. Cl. ..................... 74/5.47; 74/5.5; 74/5.6 D
[58] Field of Search ............ 74/5.5, 5.6 D, 5.4, 74/5.47, 5.6 R; 73/505

[56] References Cited

U.S. PATENT DOCUMENTS

| 3,238,791 | 3/1966 | Brodersen | 74/5.4 |
| 3,354,726 | 11/1967 | Krupick et al. | 74/5.6 D |
| 3,902,374 | 9/1975 | Hoffman et al. | 74/5.6 D |
| 3,918,310 | 11/1975 | Evans et al. | 74/5.6 D |
| 4,125,799 | 11/1978 | Harduvel | 74/5.4 X |

Primary Examiner—Rodney H. Bonck
Attorney, Agent, or Firm—Laurence A. Wright; Thomas W. Kennedy

[57] ABSTRACT

A dry tuned two axis gyro having a pulse-rebalanced rate capture loop control. This configuration eliminates the need for an analogue-to-digital converter since the gyro is torquered at a pulse rate using a constant current source. Another feature of the control loop is a cross-channel shaping network which exchanges an electronically damped error from one axis to the other axis. By means of a summing network which combines the error signals from the main channel and the cross channel with a source of time varying ramp voltage, an alternately negative to positive signal is applied to the gyro torquer.

4 Claims, 4 Drawing Figures

PULSE WIDTH MODULATED BINARY REBALANCE RATE CAPTURE LOOP CONTROL FOR TWO-DEGREE-OF-FREEDOM DRY TUNED GYRO

PRIOR ART

U.S. Pat. No. 3,354,726, Nov. 1967, W. J. Krupick et al.
U.S. Pat. No. 3,902,374, Sept. 1975, Jay Hoffman et al.

This invention is related to a dry tuned two-degree-of-freedom gyro. More particularly, this invention is related to a dry tuned two-degree-of-freedom gyro having a pluse width modulated binary rebalance rate capture loop control.

BACKGROUND OF THE INVENTION

U.S. Pat. No. 3,354,726 describes a two axis device in which all flotation fluids and their accompanying disadvantages have been eliminated. In addition, this invention teaches that by the use of a unique mechanical hinge, critical tolerances on parts normally associated with devices of inertial quality have been reduced. Heretofore, capture loops have required an analogue-to-digital converter (A/D) in order to torque the gyro to reduce torquer error. The elimination of the A/D reduces the cost of the gyro.

BRIEF DESCRIPTION OF THE INVENTION

The present invention describes a dry tuned two-degree-of-freedom gyro having a pulse-rebalanced rate capture loop control. This configuration eliminates the need for analogue-to-digital converter since the gyro is torqued at a pulse rate using a constant current source. Changes in the two gyro input axes are sensed by the X and Y pickoffs. These signals are amplified and demodulated in the X and Y channels. From the X and Y demodulator, the signals are applied to filters and thence to a shaping network. The output of the filters are also applied to a cross-channel damping network to provide electronic damping of the error signals. The outputs of the cross channel damping networks and the shaping networks are applied to X and Y comparators. These X and Y comparators also have as input signals ramp generator signals. At the output of the comparator, signals representing the summation of the signals from their inputs are pulsed width modulated signals which through logic circuits provide switchover from positive to negative torquing current.

Accordingly, it is an object of this invention to provide a pulse width modulated capture loop for a two-degree-of-freedom gyro.

This and other objects, features and advantages of the present invention will become apparent from the following description taken in conjunction with the accompanying drawings wherein.

Figure 1:
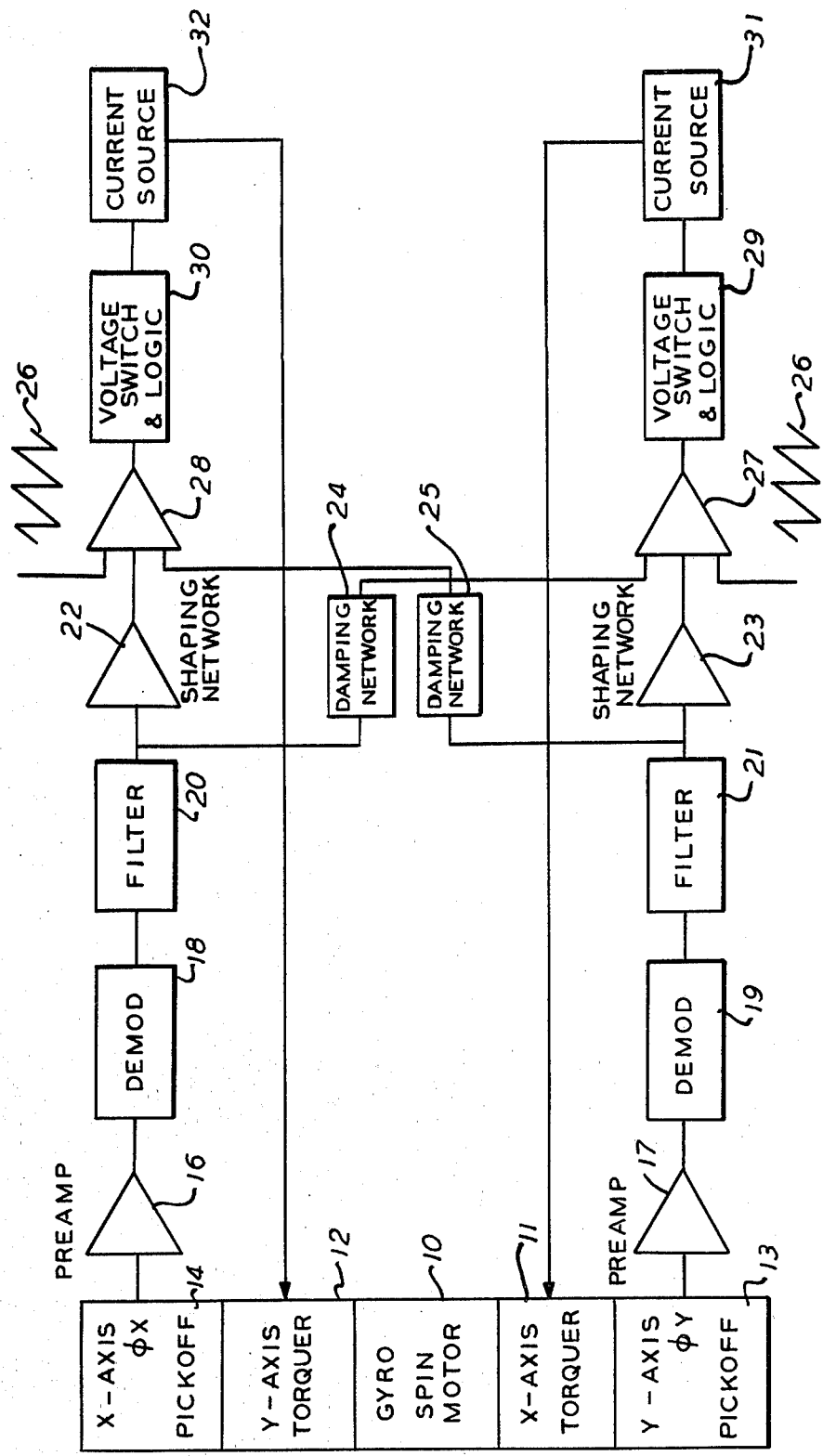
FIG. 1 is a block diagram of the pulse rebalanced rate capture loop circuit of the two axis dry tuned gyro of the invention.

Turning to FIG. 1, there is shown a block diagram of the two axis dry tuned gyro pulse rebalanced rate capture loop control scheme of the invention. Any component of rate along either the X or Y input axes of gyro 10 produces a gyroscopic torque about these sensing axes causing the wheel of gyro 10 to precess. The gyro pickoffs 13 and 14 sense the wheel position and provide a proportional electrical signal to ac amplifiers 16 and 17. From the amplifiers 16 and 17, the signal is sent through demodulators 18 and 19, notch filters 20 and 21, and cross channel damping compensation networks 24 and 25. The outputs of the main channel shaping networks 22 and 23 are summed in comparators 27 and 28 with both the outputs of the cross-channel damping networks and a ramp generator signal 26. The ramp generator signal is required in order to produce a pulse width modulated signal whose fundamental frequency is the frequency of the forced limit cycle. Main channel shaping networks 22 and 23 provide for loop stabilization and bandwidth adjustment. The purpose of the cross channel damping compensation networks 24 and 25 as the name implies is to provide for electronic damping which is novel in a dry-tuned gyro. Notch filters 20 and 21 are required in order to minimize any pickoff signal induced by wheel motion.

The variable pulse width modulated signals which is derived from the summation of both the ramp generator signal and the main and cross-channel network output signals are sent through logic circuits 29 and 30 which control switchover from positive to negative torquing current. This switchover is designed to occur in synchronism with a high frequency pulse train. As a result, each portion of the pulse width modulated signal contains an integral number of high frequency clock pulses. For example, at 50% duty cycle, each positive and negative half of the pulse width modulated signal contains equal data pulses.

Figure 2:
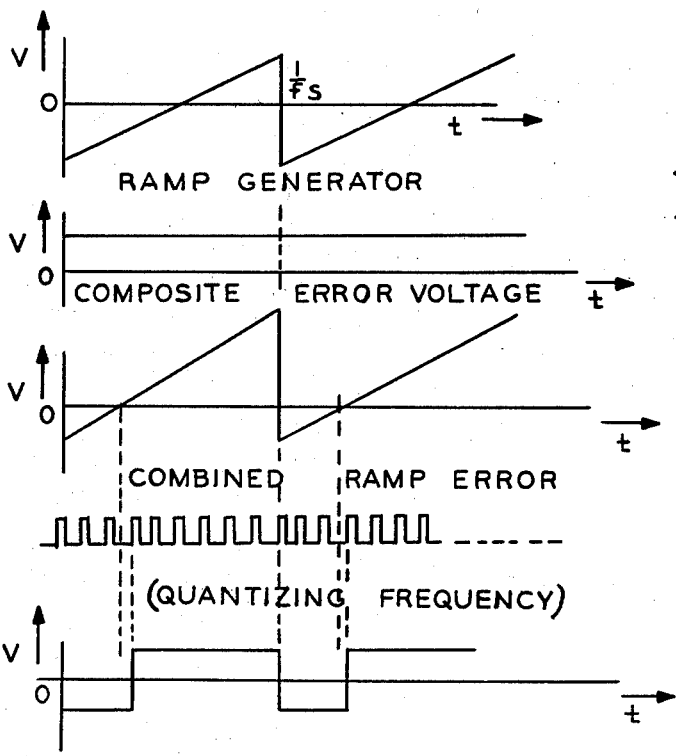
FIG. 2 is a diagram illustrating and timing relationships between the pulse width modulated and the quantization waveforms.

FIG. 2 illustrates the timing relationships between the pulse width modulated signal and the quantization waveforms. The ramp generator signal has a zero average value and a frequency equal to the frequency of the forced limit cycle. This signal, which is initially negative but becomes positive halfway through the period, is summed with the combined error signal from both the main and cross channel network outputs in summing amplifiers 27 and 28. The summing amplifier outputs are applied to comparator circuits in blocks 29 and 30 which switches from a logic "0" to a logic "1" level when the summing amplifier output crosses from negative to positive. For a zero error signal, the comparator output signal switches logic status at a point midway through the ramp period (at which point the ramp crosses through zero) to produce a 50 percent duty cycle signal. For non-zero error signals, the comparator output is a logic signal with duty cycle proportional to the error.

Figure 3A:
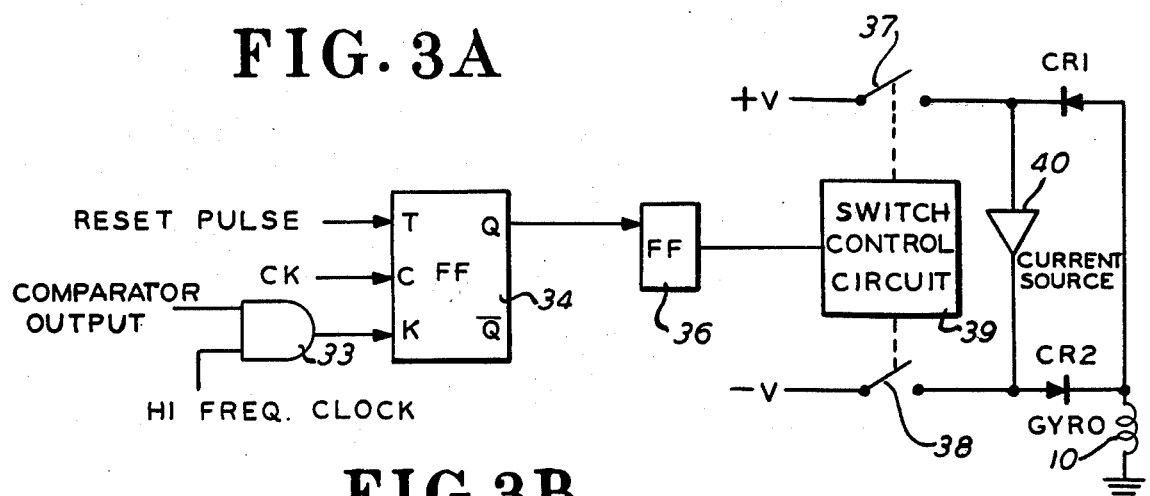
FIG. 3a is a detailed block diagram of the logic block 30 shown in FIG. 1.
Figure 3B:
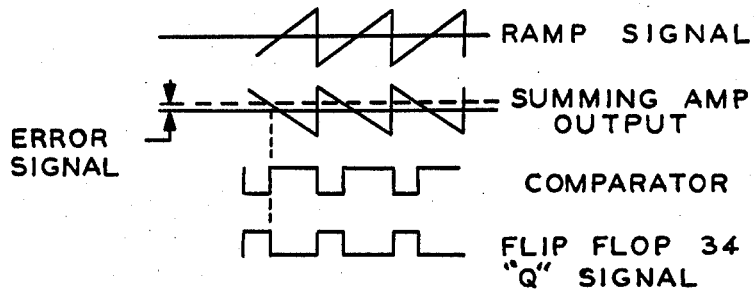
FIG. 3b is a graphical representation of the logic signals.

Referring to FIG. 3, the comparator output is gated with a high frequency clock signal in gate 33 of timing circuit 30 (refer to FIG. 1) to produce a binary signal at the frequency of the ramp generator signal and with switching points very tightly controlled. This signal is sent to the strobe circuit (not shown) which produces readout on two separate data lines (difference between the pulse current on the two lines is proportional to input rate) and to the control flip flop 36. The output of the control flip flop 36 goes to the two high speed transistor switches 37 and 38 (shown here as mechanical switches for simplicity). These switches apply either the positive B+ supply or the negative b− supply to the output current source as per the state of the control flip flop 36 as shown in FIG. 3b. The output current sources 31 and 32 of FIG. 1 are very accurate, high speed supplies which drive directly into the gyro torquers 11 and 12 of FIG. 1 and have one end referenced to ground. The current sources 31 and 32 themselves are not referenced to ground but float between the positive or negative switches D.C. supplier and the gyro torquer. Current is continually flowing in the current sources and always in the same direction with the direction of current in the torquer controlled by the two commutating diodes CR1 and CR2 and the two high speed switches 37 and 38. Thus, the current through the torquer is constant in magnitude (which means constant power in the torquer) in pulse width modulated, binary format, with repetition rate equal to the ramp frequency.

Although specific embodiments of the invention have been shown and described, it will be obvious to those skilled in the art that various modifications may be made without departing from the spirit of the invention which is intended to be limited solely by the appended claims.

What is claimed is:

1. A two axis gyro comprising:
   means for sensing gyro rotor position along a first and second axis, said sensing means also providing proportional error signals along said first and second axes when said rotor deviates from null position,
   a source of ramp voltage signals,
   means for electronically damping said error signals by summing said error signals with said source of ramp voltage signals whereby a pulse width modulated signal is produced whose fundamental frequency is the frequency of the forced limit cycle of said gyro, and
   means responsive to said electronically damped signal for alternately applying a positive and a negative torquing constant current to the first and second axes of said gyro in order to reduce said error signals.

2. The two axis gyro of claim 1 comprising:
   means for exchanging the error signals between said first and second gyro axes.

3. A pulse rebalanced rate capture loop control for a two axis dry tuned gyro comprising:
   a first axis pickoff means,
   a second axis pickoff means said first and second pickoff means sensing gyro rotor position and producing an electrical error signal,
   means for amplifying said error signal from said pickoff,
   a demodulator for processing the output signal from said amplifier,
   a filter circuit for filtering the output signal of said demodulator,
   a main channel shaping network for shaping the output signal of said filter circuit,
   a cross channel damping network for exchanging the error signals from both of said gyro axes,
   a source of ramp voltage signals,
   a summing network for processing the outputs signals of said main channel network, said cross channel network and said source of ramp voltage signals,
   logic means responsive to said summing network for alternately applying a positive or negative torquing current to said gyro, and
   a source of constant current responsive to said logic means for applying a pulse modulated torquer current to said gyro.

4. A pulse rebalanced rate capture loop control for a two axes dry tuned gyro comprising:
   pickoff means for sensing gyro rotor position and for providing error signals along the axes of said gyro,
   an ac amplifier for amplifying said error signal from said pickoff means,
   a demodulator for processing the output from said amplifier,
   a filter circuit for filtering the output signal of said demodulator,
   a main channel shaping network for shaping the output signal of said filter circuit,
   a cross channel damping network for exchanging the error signals between both gyro axes,
   a source of ramp voltage signals,
   a summing network for processing the output signals of the main channel, the cross channel and the ramp voltage,
   logic means responsive to said summing network for alternately applying a positive or a negative torquing current to said gyro, and
   constant current sources responsive to said logic means for applying a pulse modulated source of torquer current.

* * * * *